(12) United States Patent
Spetler

(10) Patent No.: US 7,694,556 B2
(45) Date of Patent: Apr. 13, 2010

(54) METHOD OF DETECTING HYDROPLANING AND ESTIMATING AN INTENSITY OF HYDROPLANING OF A TIRE ON A WET ROAD

(75) Inventor: Frederic Spetler, Lezoux (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 194 days.

(21) Appl. No.: 12/061,981

(22) Filed: Apr. 3, 2008

(65) Prior Publication Data

US 2008/0245456 A1 Oct. 9, 2008

(30) Foreign Application Priority Data

Apr. 6, 2007 (FR) .................................. 07 02574

(51) Int. Cl.
*G01M 17/02* (2006.01)
(52) U.S. Cl. ....................................................... 73/146
(58) Field of Classification Search ........................ None
See application file for complete search history.

(56) References Cited

U.S. PATENT DOCUMENTS

| | | | |
|---|---|---|---|
| 5,502,433 A | 3/1996 | Breuer et al. ................ 340/438 |
| 5,864,056 A | 1/1999 | Bell et al. ....................... 73/146 |
| 6,666,079 B2 | 12/2003 | Poulbot et al. ................. 73/146 |
| 6,991,013 B2 | 1/2006 | Poulbot et al. ............ 152/152.1 |
| 7,267,148 B2 | 9/2007 | Merino-Lopez et al. .. 152/152.1 |
| 2003/0056579 A1 | 3/2003 | Poulbot et al. ................. 73/146 |
| 2003/0101805 A1* | 6/2003 | Raab ............................. 73/116 |
| 2004/0036590 A1 | 2/2004 | Elsner et al. ................. 340/445 |
| 2005/0188756 A1 | 9/2005 | Morikawa ..................... 73/146 |
| 2006/0207319 A1 | 9/2006 | Krozer et al. .................. 73/146 |
| 2007/0295074 A1 | 12/2007 | Kobayakawa .............. 73/146.5 |
| 2008/0011092 A1 | 1/2008 | Miyoshi et al. ................ 73/779 |
| 2008/0210022 A1 | 9/2008 | Rey et al. ............. 73/862.621 |

FOREIGN PATENT DOCUMENTS

| | | |
|---|---|---|
| DE | 42 42 726 A1 | 6/1994 |
| DE | 102 42 121 A1 | 3/2004 |
| DE | 10 2004 051 654 A1 | 4/2006 |
| EP | 0 937 615 A2 | 8/1999 |
| EP | 1 076 236 A1 | 2/2001 |
| EP | 1 231 120 A1 | 8/2002 |
| EP | 1 350 640 A1 | 10/2003 |
| EP | 1 498 291 A1 | 1/2005 |
| JP | 2002087032 A * | 3/2002 |
| WO | WO 2006/117480 A1 | 11/1996 |
| WO | WO 02/08721 A1 | 1/2002 |

* cited by examiner

*Primary Examiner*—Lisa M Caputo
*Assistant Examiner*—Jermaine Jenkins
(74) *Attorney, Agent, or Firm*—Fitzpatrick, Cella, Harper & Scinto

(57) ABSTRACT

In a method of detecting hydroplaning and estimating an intensity of hydroplaning of a tire of a vehicle travelling over a wet ground of a road, measurements are made of stresses in the tread of the tire, a water height present on the road is estimated, and, based on the measured stresses and the estimated water height, hydroplaning is detected and its intensity is estimated.

19 Claims, 9 Drawing Sheets

METHOD OF DETECTING HYDROPLANING AND ESTIMATING AN INTENSITY OF HYDROPLANING OF A TIRE ON A WET ROAD

FIELD OF THE INVENTION

The present invention relates to the detection and the evaluation of the start of hydroplaning of a tire on a wet ground of a road travelled on by a vehicle. For this purpose, stresses (or any other equivalent measurement, such as displacements or strains) in a tread of the tire of the vehicle are measured.

BACKGROUND

It is in fact useful to be able not only to detect but also to quantify the phenomenon of hydroplaning occurring under a tire.

Hydroplaning is characterized by the momentary presence of an amount of water between a surface of the ground making up the road and a surface of the tread in contact with the ground. Now, the presence of water, even if momentary, between these two surfaces introduces the effect of an isolating film. Such a film prevents some or all force from being transferred between the tire or tires of the vehicle and the ground of the road. Consequently, this phenomenon of hydroplaning results in loss of grip, loss of traction when accelerating or braking, and also loss of steering control, in particular in road bends.

A film of water forms when the flow rate of water flowing between the two surfaces becomes greater than the flow rate of water that both the features of the road pavement and patterns in the tread of the tire can remove. This saturation effect therefore, for a constant height of water on the ground, increases more suddenly and more substantially with an increasing speed of the vehicle. Complementarily, at constant speed, the saturation effect occurs more rapidly if the height of water present on the surface of the ground increases.

The consequences of hydroplaning as a result of a saturation effect, especially during an acceleration by application of a driving force, during a deceleration by application of a braking force, or during a change in direction, are serious and involve a partial or even complete loss of control of the vehicle. It is therefore of paramount importance when travelling on a wet road to be able to anticipate the conditions for hydroplaning and better still to quantify such conditions.

To the driver of the vehicle, no warning sign, apart from seeing a wet road, precedes the onset of partial or complete hydroplaning—the danger cannot therefore be foreseen.

In addition, a measurement of hydroplaning provides information that proves essential for the various electronic assistance devices used, for example, for controlling an antilock braking system (ABS) of a vehicle, antiskid regulation (ASR) of driving wheels, trajectory control (ESP) or other forms of control or monitoring, such as for example for monitoring tire pressure. This is because such information, coupled for example with a measurement of grip ($\mu$), would enable the effectiveness of the abovementioned devices to be greatly improved in real time.

Thus, at the moment that the start of hydroplaning is detected, not only can a warning be indicated to the driver of the vehicle, but also a measurement corresponding to an intensity or degree of this hydroplaning can be sent to the various active safety devices mentioned above, so as to modify or refine their triggering parameters.

It is known from U.S. Pat. No. 5,502,433 to detect hydroplaning, but this patent in no way teaches a method or a device for quantifying it, the patent merely describes the determination of a preset warning threshold that does not at all take into account a height of water liable to be present on the ground at the moment of hydroplaning. The water height parameter considerably modifies, at constant speed, both the moment of onset of hydroplaning and its intensity. The prior determination, as provided by the patent cited above, of a level of a threshold above which hydroplaning is assumed to be initiated therefore does not optimize an opportunity or even a reliability of a triggered warning.

SUMMARY OF THE INVENTION

The aim of the invention is to solve the above-mentioned problems.

In the following discussion, unless otherwise indicated, the following meanings generally apply:
 "apparent area of contact" or "apparent contact area": that portion of the tire tread at which one or more sensors in or on the tire tread give a non-zero signal;
 "direct contact area": that portion of the tire tread at which contact between the ground and the tread is a direct contact; and
 "indirect contact area": that portion of the tire tread at which a film of water lies between the tread and the ground.

One subject of the invention is a method of detecting and estimating an intensity of hydroplaning of a tire of a vehicle travelling on a wet ground of a road, a tread of the tire being equipped with one or more sensors each capable of measuring a characteristic quantity of stresses that the tread undergoes or experiences locally when the tire is rolling on the ground. The method includes the following steps:
 obtaining measurements of a characteristic quantity using one or more sensors located in or on a tread of a tire when the tire is rolling on a ground;
 producing a signal corresponding to the measurements;
 extracting a portion of the signal relating to a passing of the one or more sensors into an apparent area of contact between the tire and the ground;
 determining a first instantaneous value ($\Delta L$), corresponding to a length of an indirect contact region of the apparent area of contact between the tread of the tire and the ground, and a second instantaneous value ($\Delta E$, $R_z$, $A_x$), corresponding to an intensity of hydroplaning in the indirect contact region relative to a remainder of the apparent area of contact, based on the extracted portion of the signal;
 estimating a water height ($h_w$) from a calculation that takes into account the determined first instantaneous value ($\Delta L$); and
 estimating the intensity of the hydroplaning from the estimated water height ($h_w$) and from the second instantaneous value ($\Delta E$, $R_z$, $A_x$).

According to a first method of implementing an embodiment of the invention, the characteristic quantity measured by the one or more sensors is characteristic of compressive stresses undergone or experienced by the tread of the tire in a direction normal to a plane of the ground.

The step of determining a first instantaneous value ($\Delta L$) is such that:
 when the extracted portion of the signal includes two successive plateaus, the instantaneous value is a measurement of a length ($\Delta L$) of the first plateau, on an entry side of the apparent area of contact; and
 when the extracted portion of the signal includes a single plateau, the instantaneous value is zero.

The step of determining a second instantaneous value (ΔE) corresponds to:
- differentiating the signal;
- determining a minimum value $$\left(\frac{d\square dx}{}\right)_{min}$$

and a maximum value $$\left(\frac{d\square dx^2}{}\right)_{max}$$

of the differentiated signal and also determining positions ($l_{min}$, $l_{max}$) of the minimum value and the maximum value; and calculating the second instantaneous value (ΔE) as corresponding to a difference in position between the minimum and maximum values of the differentiated signal: $\Delta E = 1_{min} - 1_{max}$.

A position of a measurement point corresponds to a longitudinal reading where a measurement of a compressive stress $\sigma_z$ is taken, along a linear deployment of a part of the tread corresponding to the extracted portion of the signal, and $$\square \frac{d}{d\xi_x}$$

represents a first derivative of the stress measurement with respect to x, which is the position of the sensor (used to make the measurement) on a longitudinal rolling axis X of the tire in the plane of the ground.

Advantageously, an alarm is triggered when the second instantaneous value ΔE is above a given threshold.

The step of determining a second instantaneous value ($R_z$) is such that:
when the extracted portion of the signal includes two successive plateaus, the instantaneous value ($R_z$) is equal to:

$$R_x = \frac{\sigma^{zi} - \sigma^{zd}}{\sigma^{zd}},$$

in which $\sigma_{zi}$ represents an amplitude of compressive stresses of the first plateau and $\sigma_{zd}$ represents an amplitude of compressive stresses of the second plateau; and when the extracted portion of the signal includes a single plateau, the instantaneous value ($R_z$) is equal to −1.

Advantageously, an alarm is triggered when the instantaneous value ($R_z$) is above a given value and preferably when the instantaneous value ($R_z$) is positive.

According to a second method of implementing an embodiment of the invention, the characteristic quantity measured by the one or more sensors is characteristic of longitudinal shear stresses undergone or experienced by the tread of the tire. The longitudinal direction X corresponds to the direction in which the tire rolls on the ground.

The step of determining a first instantaneous value (ΔL) is such that:

when the extracted portion of the signal includes, on an entry side of an apparent area of contact, two successive positive peaks, the instantaneous value is a measurement of a length (ΔL) separating respective maxima of the two peaks; and when the extracted portion of the signal includes a single positive peak, the first instantaneous value (ΔL) is zero.

The step of determining a second instantaneous value ($A_x$) is such that:

when the extracted portion of the signal, on the entry side of the apparent area of contact, two successive positive peaks, the second instantaneous value is a measurement of an amplitude ($A_x$) of the first positive peak; and when the extracted portion of the signal includes a single positive peak, the second instantaneous value ($A_x$) is zero.

According to a preferred method of implementing an embodiment of the invention, each sensor measures both a characteristic quantity of normal compressive stresses and a characteristic quantity of longitudinal shear stresses undergone or experienced by the tread of the tire.

Utilizing signal portions associated with these two quantities characteristic of the stresses makes the detection and the estimation of an intensity of hydroplaning encountered more robust.

Advantageously, the water height ($h_w$) is determined from the first instantaneous value (ΔL) using a chart.

Such a chart can in fact be constructed from experimental measurements carried out with several controlled water heights.

Alternatively, the water height ($h_w$) may be determined using the following equation:

$$h_w = K\left\{1 - \cos\left(\arcsin\frac{\Delta K}{} \frac{L}{}\right)\right\},$$

where $h_w$ is an estimated water height, ΔL is the first instantaneous value, and K is a constant associated with the tire. An excellent estimate of the constant K is a radius of a transition zone ($R_K$) as defined in a Koutny model. We can represent variations in belt curvature using a simple geometric model known as the Koutny model. The Koutny model includes three tangential circular arcs. One arc corresponds to a curvature in an upper part of the tire and two arcs identical to each other correspond to a curvature of the tire when entering and leaving an apparent area of contact. Knowing a length of a contact path and an invariable length of the belt, this model can be used to calculate $R_K$. The Koutny transition zone radius is well known to those skilled in the art in the field of tires.

Advantageously, an intensity of hydroplaning may be estimated from a quantity $1 - S/S_0$, which is a function based on two surfaces:

a first surface S determines an instantaneous area of direct contact of the tread of the tire when measured on wet ground at a speed of the vehicle; and a second surface $S_0$ determines a maximum ideal area of direct contact of the tread of the tire on dry ground and/or for a low speed of the vehicle guaranteeing that hydroplaning cannot start.

The quantity $1 - S/S_0$ characterizing the intensity of the hydroplaning is determined from:

a knowledge of at least a second instantaneous value (ΔE, $R_z$, $A_x$);

an estimated calculation of a water height ($h_w$) present on the ground; and an experimental chart representing a variation in the quantity $1-S/S_0$ as a function of the second instantaneous value ($\Delta E$, $R_z$, $A_x$) for various predetermined water heights ($h_w$).

Also advantageously, an alarm is triggered when the quantity $1-S/S_0$ exceeds a given threshold.

A method according to an embodiment of the invention thus takes into account measurements of longitudinal shear stresses or normal compressive stresses (or any other equivalent measurement, such as displacements or strains) taken by one or more sensors incorporated into the tire, making it possible, according to a defined criterion that depends on the type of stress measured, firstly to detect hydroplaning and then, thanks to this criterion, to determine a quantity $1-S/S_0$ that quantifies an intensity of the phenomenon of hydroplaning. A first surface S determines an area of contact between dry or wet ground and the tread of the tire in real time at the instant of the measurement for a chosen speed, and a second surface $S_0$ determines an area of contact between dry ground and the tread of the tire or a low enough speed to avoid any possibility of hydroplaning. More precisely, the surface S takes into account a possibility of a tread surface being placed against a film formed by hydroplaning. In the case of hydroplaning, contact between the tread and the ground is indirect and does not faithfully transmit forces from the tire, as may be required by the driver of the vehicle, to the ground. The surface S therefore corresponds to the surface $S_0$ as determined from the surface of the water film present between the tire and the ground and is characteristic of the start of hydroplaning.

Thus, curves in the form of a chart defining the characteristic quantity $1-S/S_0$ as a function of a rolling speed of the tire and for various water heights are determined beforehand by experimental measurements. A criterion that can be analyzed on the basis of stress measurements applied directly to the tire is then determined. This criterion must faithfully reflect, for a given speed, the results obtained from a curve of the chart.

Specifically, by knowing the speed of the vehicle, and therefore of the tire, and the height of water in contact with the tire, it may be possible to determine directly from the chart the quantity $1-S/S_0$ characteristic of the intensity of hydroplaning, but this procedure is not entirely satisfactory as it does not take into account a local effect of hydroplaning, which is also dependent on a quality of the ground beneath each tire. On a road, the pavement may in fact differ from one side of the vehicle to the other. In addition, conditions may be different depending on whether the front tires or the rear tires are involved, because the rear tires may follow a path on the road that is slightly dried by the front tires. It is therefore necessary to determine and then quantify a criterion that is dependent on or is a function of a local stress measurement on a tire.

Thus, once this correlation has been verified, not only for various speeds of the tire and/or the vehicle but also for various water heights, at the time of the measurements, embodiments of the invention make it possible, upon detecting the criterion, to detect the occurrence of hydroplaning. Moreover, by quantifying this criterion it is then possible to define the quantity $1-S/S_0$ characteristic of the hydroplaning and to determine its intensity.

However, this requires knowing, in addition to the criterion, and at the moment of its measurement, the height of water in contact with the tread of the tire so as to select a corresponding curve from the chart and, by correlation, to determine the quantity $1-S/S_0$ therefrom.

It is thus possible for example to determine a threshold that is a function of a $1-S/S_0$ constant value, taking into account local measurements—the water height and the criterion—taken directly on a tire and in real time. This quantity $1-S/S_0$ therefore characterizes, as a percentage, the intensity of the hydroplaning.

Thus, at the extremes, for a $1-S/S_0$ value equal to 0, the two surfaces are identical and there is 100% grip available and 0% hydroplaning, while for a $1-S/S_0$ value equal to 1, the surface S is zero and there is 0% grip available and 100% hydroplaning. In the latter case, any control of the vehicle via the tire is no longer possible at all.

Between these two extreme values there are for example cases of 30%, 40%, or 70% hydroplaning corresponding to respective $1-S/S_0$ values of 0.3, 0.4, and 0.7.

An aspect of an embodiment of the invention is a device for detecting and estimating an intensity of hydroplaning of a tire of a vehicle travelling on a wet ground of a road. The device includes:

a tire having a tread that is equipped with one or more sensors each capable of measuring a characteristic quantity of stresses undergone or experienced by a tread of the tire rolling on a ground;

a transmitter for transmitting a signal corresponding to measurements of the characteristic quantity obtained by the one or more sensors; and a signal processing unit for extracting, from the transmitted signal, a signal portion corresponding to a number or to a duration of passage of the one or more sensors in an area of contact of the tire rolling on the ground, wherein, in the processing unit, a program is included for implementing a method according to an embodiment of the invention, on the basis of the extracted signal portion.

BRIEF DESCRIPTION OF THE DRAWINGS

The invention will be more clearly understood upon reading the following description and examining the accompanying figures. These figures have been given merely by way of example illustrations and in no way do they limit the claimed invention.

The drawings of the figures depict.

DETAILED DESCRIPTION OF EMBODIMENTS OF THE INVENTION

Figure 1:
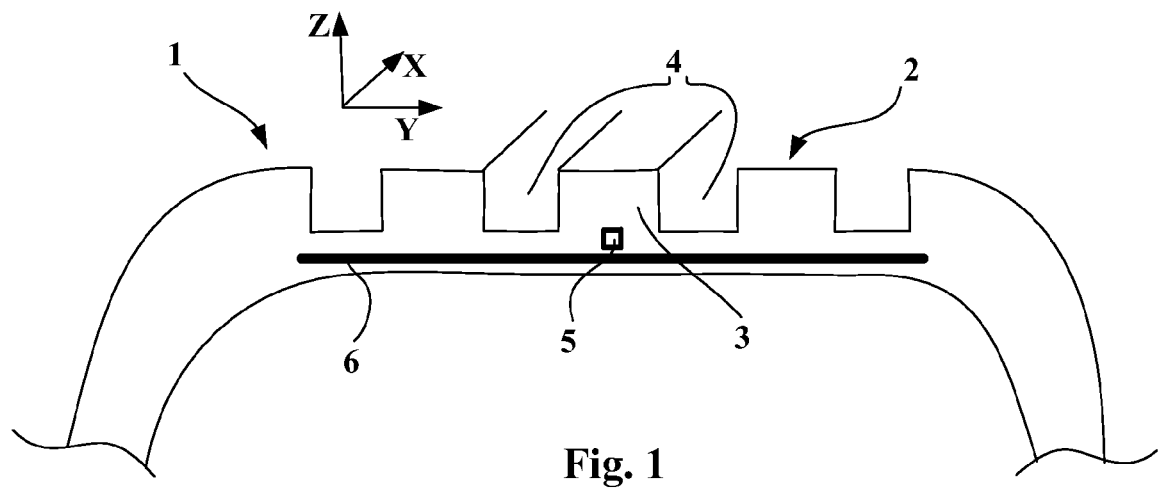
FIG. 1: a schematic representation of a sensor in a tread of a tire.

FIG. 1 shows highly schematically a partial axial cross section of a tire 1 with its tread 2. The tread 2 may also correspond to that of a resilient non-pneumatic tire.

An outer surface of the tread of the tire is not smooth but usually includes a number of longitudinal grooves 4 and transversal or substantially transversal grooves for facilitating water evacuation on wet roads. The longitudinal and transversal grooves define blocks of rubber that come into contact with the road surface and correspond to a pattern of the tread of the tire. In FIG. 1, the block 3 lies between longitudinal grooves 4 and two transversal grooves (not shown).

Some of the blocks 3 include a stress sensor 5 (or a sensor for sensing another equivalent quantity) or a plurality of sensors 5. What is thus obtained is a measurement block. The sensor 5 is implanted into a base of the measurement block 3 and above reinforcing plies 6 of the tire's structure. It is essential for the sensor 5 to be placed in a volume of rubber that does not undergo wear during the lifetime of the tire. In this way, measurements are possible throughout the lifetime of the tire. According to an aspect of the invention, the sensors used for measuring stresses are preferably placed on or in blocks 3 located at a center of a width of the tire along the Y-axis of FIG. 1, that is, between its two shoulders. However, it is readily possible within the context of the invention for the sensors to be placed on or in the shoulder.

An objective of each of the sensors is to measure a stress (or a force) experienced by the tread 2 or, according to a variant, a displacement or even a strain of the tread 2.

The sensors used for the measurements operate according to various technologies—they may be piezoelectric or piezoresistive gauges or capacitors. Thus, it is possible for example to combine a Hall-effect sensor with a magnetic element, the whole assembly being embedded in the rubber of the tire. For more details about the technologies that may be employed by the sensors, the reader may refer to U.S. Pat. No. 6,666,079, which gives a description of various stress sensors that may be used in a tire.

Figure 2:
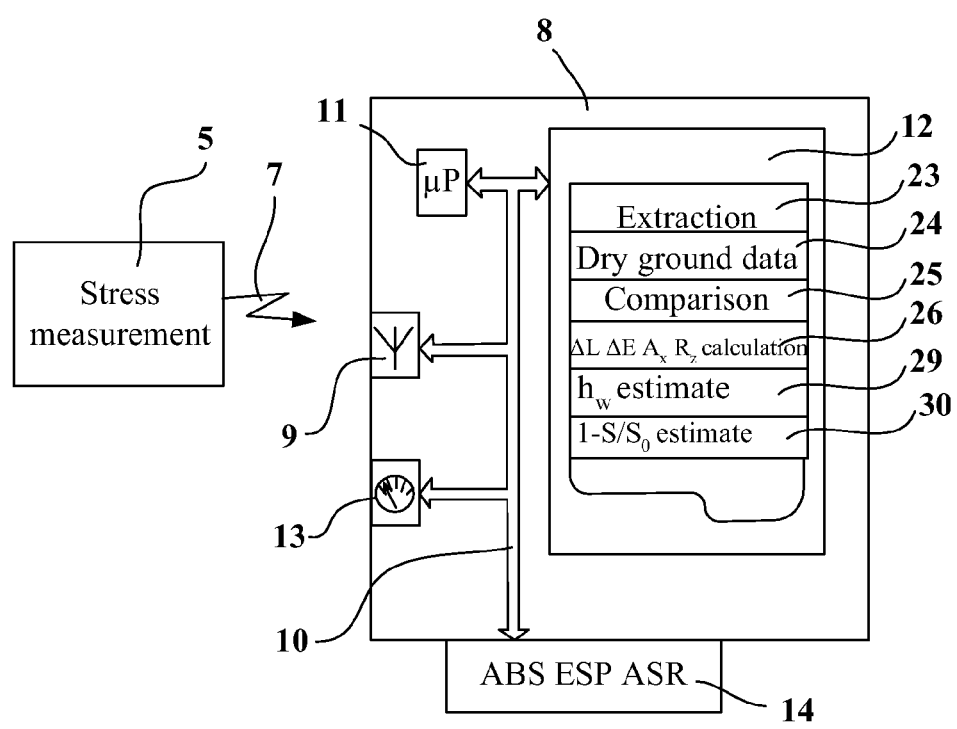
FIG. 2: a schematic representation illustrating a device according to an embodiment of the invention.

FIG. 2 illustrates a measurement device according to an embodiment of the invention. The device includes a sensor 5 for measuring stresses in a tire and a transmitter 7 for transmitting a signal produced by the sensor 5 to a signal processing unit 8. The processing unit 8 is preferably placed in the vehicle. In a variant, the processing unit 8 may be placed in the tire itself. This variant requires a transmitter for transmitting the processed signal to the driver of the vehicle.

Those skilled in the art also will know the various possible forms of transmitters for transmitting a signal between the tire and the vehicle. For this purpose, the reader may refer to European patent document EP-A-1 350 640, which illustrates in particular a transmitter that includes an antenna that is implanted in a tire. The antenna is positioned within the actual tread 2 and is linked via a cable to a sensor 5.

The antenna may be an electric field antenna of the quarter-wave type, or else of the frequency-modulation or amplitude-modulation type for a power signal. It is useful to point out here that a primary antenna fixed on the vehicle facing a secondary antenna placed in the tire also makes it possible, by an inductance effect, to transmit power from the primary antenna, for example connected to a battery of the vehicle, to the secondary antenna so as to deliver energy to the sensor 5. A microbattery inserted with the sensor 5 into a premoulded insert in the tread 2 may also provide this function.

In FIG. 2, a signal corresponding to stress measurements made by the sensor 5 is transmitted via the transmitter 7 to the processing unit 8 after having been picked up by an antenna 9.

Moreover, operation of the sensor 5 may take place via an electronic measurement circuit of an ASIC (application-specific integrated circuit) type, a supply system, such as that mentioned above, and a system for encoding measurements, all of these units operating before transmission of the signal corresponding to the measurements to be analyzed. The antenna 9 is connected to a microprocessor 11 of the processing unit 8 via an internal connection bus 10.

The processing unit 8 includes a program memory 12. A program stored in the memory 12 makes it possible, according to various program sections, to process the signal until information for the detection of hydroplaning and for evaluating an intensity of the hydroplaning is obtained. Once the information has been obtained, via the connection bus 10, the information may be displayed on a display unit 13 placed inside the actual vehicle.

For example, the display unit 13 may take the form of a dial displaying relative and easily interpretable data. This is because intrinsic hydroplaning data may be of only limited significance to the driver of the vehicle. What is most important for the driver is to be aware of hydroplaning so as therefore to regulate his speed, by reducing his speed or by adapting his type of driving, for example by driving more cautiously and less aggressively. The information may for example be in the form of a green zone indicating a low level of hydroplaning, an amber zone indicating substantial hydroplaning hazardous to driving, and finally a red zone indicating hydroplaning deemed to be critical.

The information used in the detection of hydroplaning and evaluation of its intensity may also be transmitted, additionally or only, to various active safety devices 14 present on or in the vehicle.

The safety devices 14 include an antilock braking system (ABS) and trajectory correction (ESP) or antiskid (ASR) devices. These devices 14 take into account, instantly and according to various criteria, a behaviour of the tire on the ground making up the road. It is therefore advantageous for the devices 14 to incorporate an additional criterion that takes hydroplaning into account.

The various active safety devices 14 may thus improve their sensitivity by taking into account the height of water $h_w$ present in front of and/or beneath the tire.

Figure 3:
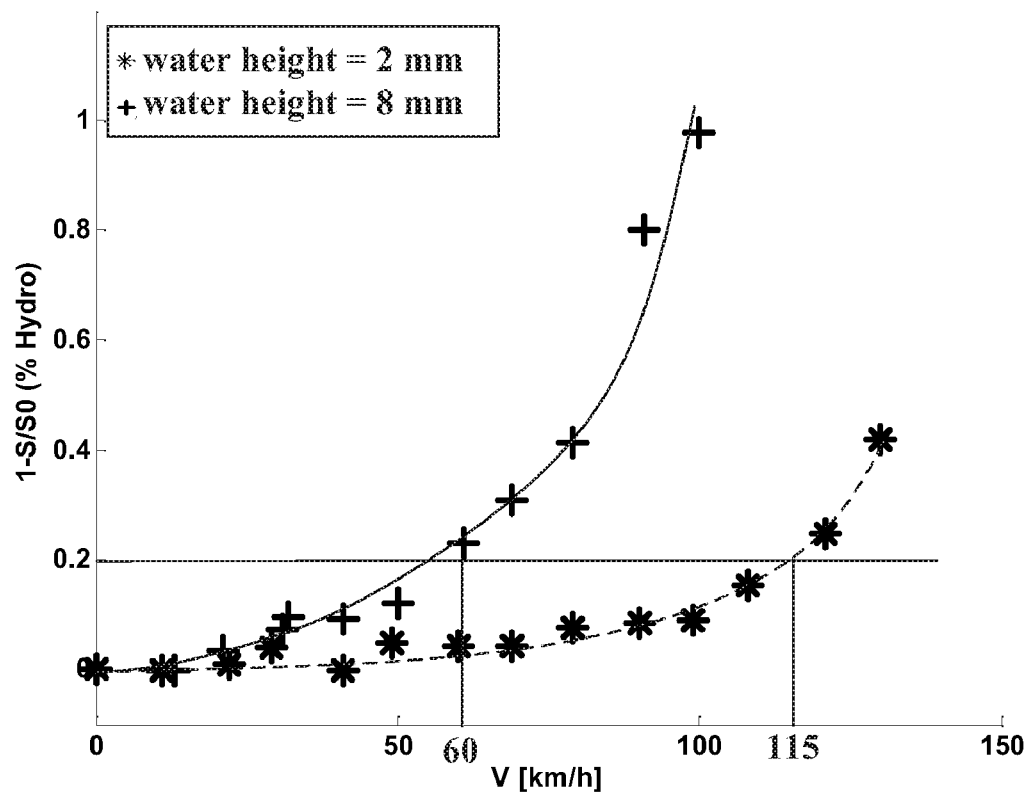
FIG. 3: a curve showing a quantity $1-S/S_0$ as a function of speed of the tire and for two water heights, 2 and 8 mm, respectively.

FIG. 3 shows a variation of a quantity $1-S/S_0$ used in characterizing hydroplaning as a function of a rolling speed V of a tire for two water heights, 2 and 8 mm, respectively.

A surface S of the quantity defines a measured instantaneous direct contact area between the tread of the tire and wet ground. The direct contact area corresponds to an area between material of which the ground of the road is made and material of which the tread of the tire is made, with no intermediate material, that is, without it being possible to have a film of water between the ground and that part of the tread rolling on the ground.

Thus, on a ground having a certain height of water, the direct contact area is reduced when a film of water characterizing the onset of hydroplaning starts to occur.

A second surface $S_0$ defines a direct contact area between the tread and the ground when dry or defines a contact area between the tread on wet ground but for a low vehicle speed.

This is because in the latter case, the low speed of the vehicle guarantees not only a low resistance of the water present in front of the tire or tires of the vehicle but makes it possible most particularly for patterns in the tread of the tire to act over a longer period for evacuating the water between the tire and the ground and thus prevent the formation or the onset of formation of a water film.

The surface $S_0$ is therefore a maximum direct contact surface that the tire can develop on the ground, irrespective of the speed and the water height.

The quantity $1-S/S_0$ is therefore zero in the absence of hydroplaning even with a height of water on the ground, but for low speeds between 0 and about 20 km/h, and this quantity is equal to 1 when there is complete hydroplaning beneath the tire.

FIG. 3 illustrates the very strong influence of speed and water height on hydroplaning. For a water height on the ground of 2 mm (dotted curve), a 20% hydroplaning threshold is reached at a speed of 115 km/h, whereas this threshold is reached at 60 km/h for a water height of 8 mm (solid curve).

The phenomenon of hydroplaning is thus correctly represented and characterized by the quantity $1-S/S_0$.

Figure 4:
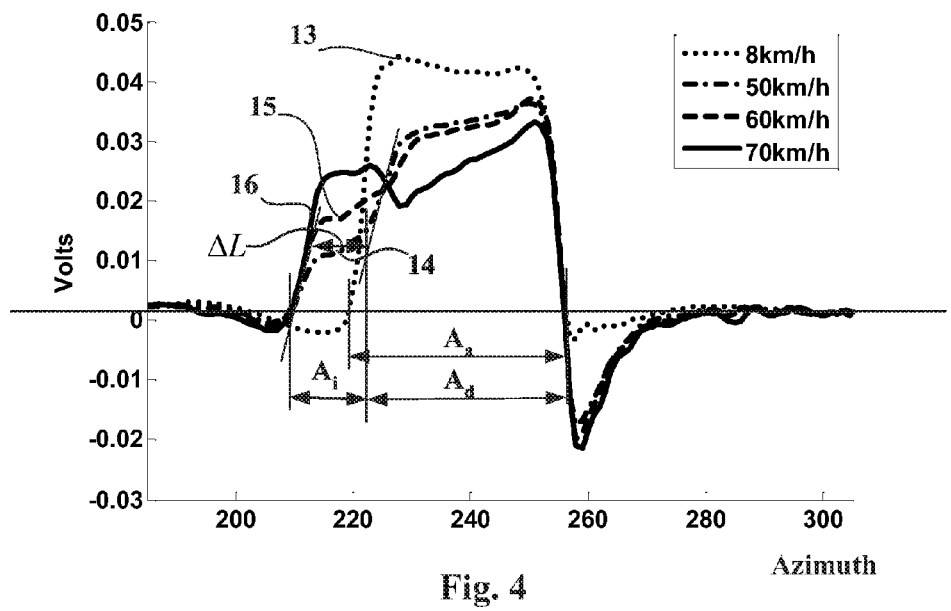
FIGS. 4 and 5: curves showing recordings of measurements of normal compressive stresses in an apparent contact area of a tire as a function of various rolling speeds and for two defined water heights, 2 mm and 8 mm, respectively.

FIG. 4 shows several curves corresponding to signals obtained by normal stress measurements as a function of the tread 2 of the tire 1 rolling along the ground corresponding to the road. These various curves correspond to various tire rolling speeds. The scale on the y-axis is arbitrary and corresponds to values given by a measurement sensor 5 in volts. Shown on the x-axis are positions of measurement points in an apparent contact area in accordance with an order number of the measurements being analyzed. Sampling is carried out with 512 measurements per revolution. These order numbers are directly linked to respective azimuths of the measurement points.

Thus, a linear deployment of one complete circumference, that is, one complete revolution of the tire on the ground, corresponds on the x-axis, in the present example, to 512 measurement points.

FIG. 4 shows that measurement signals have an almost zero amplitude at a start and at an end of the signals, disregarding a slight offset. To simplify matters, in the case of measuring stresses normal to the ground, that portion of the signals in which an amplitude of the signals is positive is referred to as an "apparent contact area". A positive value of the signals corresponds to a compression of the measurement block 3, and a negative value corresponds to an extension of the measurement block 3.

In FIG. 4, the signals were obtained experimentally for a predetermined water height of 2 mm on the ground. The measured stresses are those corresponding to compressive stresses undergone or experienced by the tread 2 of the tire 1 and more precisely by a sensor 5 in the tread 2 during its passage in the apparent contact area with a plane of the ground, along a direction normal to the plane of the ground.

Curve 13 in FIG. 4 represents a signal corresponding to stress measurements for a low tire rolling speed, namely 8 km/h. At this low speed, the presence of a height of water on the ground has no effect on a normal stress signal, and the signal detected at this speed corresponds to that which may be found on a completely dry road. Thus, when a stress sensor or sensors lies or lie outside a direct contact area of the tread with the ground of the road, measured stresses are substantially zero. That part of the curve corresponding to negative stress measurements corresponds to a section of the tread leaving a region of compression on the ground and resuming a natural curvature of the tire.

With the above definition, it is possible to estimate a length of the apparent contact area $A_a$, which in this case is also the direct contact area $A_d$, by the portion of the curve 13 indicated as $A_a$.

Curves 14, 15, and 16 were obtained experimentally for the same water height of 2 mm at speeds of 50, 60, and 70 km/h, respectively. These curves have a substantially different form to that of curve 13. Having normalized all the curves to a point where, to a rear region of the apparent contact area, the stress passes through zero again, it may be seen that the apparent contact area $A_a$ is substantially elongated at a starting region of the apparent contact area. This shows a first plateau, the height of which increases with increasing speed. It is possible to estimate that a length of this first plateau or an instantaneous value $\Delta L$ corresponds to a length of an indirect contact area $A_i$, that is, an area in which a water film lies between the tread and the ground. It may also be seen that a length of a direct contact area $A_d$ is substantially reduced relative to that of curve 13.

To be able to estimate the length of the indirect contact area $A_i$, a method according to an embodiment of the invention determines the instantaneous value $\Delta L$. FIG. 4 illustrates a method of determining $\Delta L$ in which a shift between the two successive rising fronts associated with the first plateau and a second plateau is determined. The shift illustrated in the case of curve 14 has a value that practically does not vary with speed within a wide speed range. It may also be seen that curve 16, obtained at a speed of 70 km/h, has a form that is difficult to interpret, in which the two plateaus seem to have a similar height. This indicates that hydroplaning has become very pronounced.

Thus, an elongation of the apparent contact area $\Delta L$ is practically independent of the rolling speed of the tire. The presence of the first plateau on the signal being analyzed, as soon as the tire is rolling at a speed of for example 40 km/h, is due to an appearance of further stresses.

The further stresses are due to a height of water present just in front of the tire over its entire width, along the Y axis of the tread 2. This height of water thus has the effect of establishing an intermediate contact between the ground of the road and the tread 2 of the tire, before direct contact of a measurement block 3 with the ground of the road.

In this case, stress is therefore always generated between the ground and the tread 2 of the tire but via the liquid element that the height of water forms. The first plateau observed from the signal is therefore that of a sensor detecting a stress on the ground via the liquid element corresponding to this height of water. This signal therefore represents the resistance (hydrostatic pressure) offered by the water to the measurement block of the tire, which depends on the rolling speed according to $P \approx \frac{1}{2} \rho V^2$ ($\rho$ being the density and V the rolling speed). At low speed, the height of water present does not have the effect of causing the same first plateau in the measured signal, because entry of the sensor (i.e., the measurement block) into the corresponding volume of water requires sufficient speed to create sufficient resistance or tension on the part of the liquid element, and consequently a significant stress.

Figure 5:
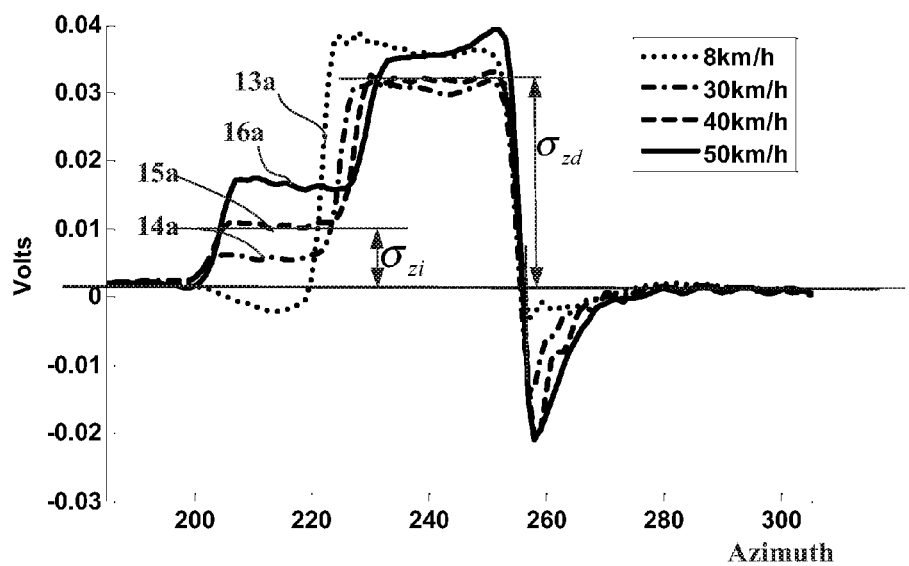

Plotted in FIG. 5 on the y-axis and x-axis, respectively, are the same parameters as described in the case of FIG. 4, and respective curves 13a, 14a, 15a, and 16a corresponding to tire rolling speeds of 8, 30, 40, and 50 km/h, respectively, but for an 8 mm water height on the ground.

At low speed (8 km/h), curve 13a is very substantially identical to curve 13 obtained for a 2 mm water height. For higher vehicle speeds, in this case 30, 40, and 50 km/h, an elongation of the apparent contact area $\Delta L$ on the ground is again observed. These results are obtained for a used tire, strictly identical to that providing the results shown in FIG. 4, in this case a Michelin Energy 195/65R15 XHI tire.

In the latter case, the elongation $\Delta L$ of the apparent contact area is greater than that observed for a water height of less than 2 mm. Also in this case, it is observed that the elongation $\Delta L$ obtained for a water height of 8 mm does not depend, once detected thanks to a sufficient speed, on the rolling speed of the tire.

The length of the apparent contact area is however greater, because the height of water present frontally with the width of the tread of the tire is larger.

Thus, the contact established by the presence of this liquid medium between the tread of the tire and the ground of the road is established higher up the tire, and therefore earlier. The sensor (i.e., measurement block) therefore enters earlier into the part corresponding to the apparent area of indirect contact (because this takes place via a water film) between the ground and the tread 2 of the tire 1. That part of the signal corresponding to an elongation $\Delta L$ of the apparent contact area is therefore larger.

Then, starting from a measurement index close to 225, contact is again a direct contact between the ground and the tread, and the stress signals for curves 14a, 15a, and 16a are substantially identical to those corresponding to curves 14, 15, and 16 of FIG. 4.

The passage of a tread sensor (i.e., a measurement block) into an area of contact with the ground of the road therefore has two parts: a first part ($A_i$) corresponding to contact of the measurement block with the ground of the road, but via a liquid element corresponding to a height of water that it is desired to estimate, and a second part ($A_d$) corresponding to a direct contact of the measurement block with the ground of the road.

Figure 6:
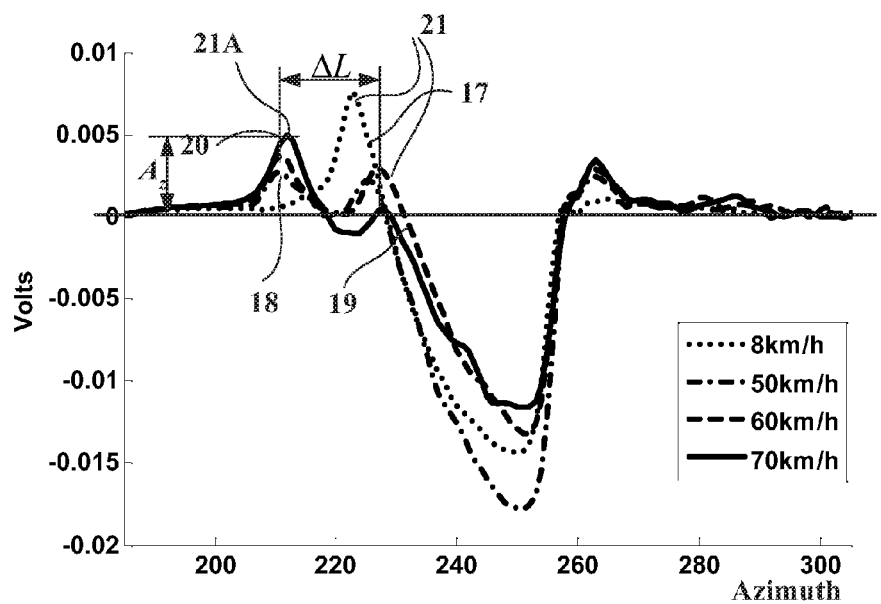
FIGS. 6 and 7: curves showing recordings of measurements of longitudinal shear stresses in an apparent contact area of a tire as a function of various rolling speeds and for two defined water heights, 2 mm and 8 mm, respectively.

In FIG. 6, curves 17, 18, 19, and 20 are obtained for speeds of 8, 50, 60, and 70 km/h, respectively, of the tire on the ground. These curves show, plotted on the y-axis, shear stresses along the X axis of the tread, that is, along the circumferential direction of rolling of the tire on the ground, and, plotted on the x-axis, measurement points all along the tread. Only part of the tread is shown here, and corresponds to the significant measurements.

At low speed, in this case 8 km/h, the stress signal corresponding to curve 17 is similar or substantially similar to that observed for a ground that is dry or wet but does not have a height of water. At the moment of contact of the measurement block 3, in which the stress sensor is located, with the ground, the shear stresses recorded become positive or driving (stresses oriented in the rolling direction), pass through a maximum 21 and then, during the remainder of the time the sensor is present in the apparent area of contact with the ground, the shear stresses move towards negative or braking values, i.e., opposing the direction of rolling of the tire. Finally, on leaving the apparent contact area, the stresses undergone or experienced by the tread 2 are again substantially zero. This "S-shaped signal" corresponds to the conventional mechanics of a pneumatic tire tread in contact with the ground, well known to those skilled in the art.

For substantial speeds of 50, 60, and 70 km/h corresponding to curves 18, 19, and 20, respectively, there again appears a peak 21 corresponding to the same physical phenomenon, together with a first peak 21A called an anticipated peak, which is detected before the peak 21. This anticipated first peak 21A, of positive stress, is higher the greater the speed. For reasons similar to those mentioned above in the case of FIGS. 4 and 5, the appearance of this first peak 21A arises from the entry, at a high enough speed, of a measurement block with a longitudinal stress sensor into the height of water present between the tread 2 of the tire and the ground.

When a distance $\Delta L$ between the two peaks 21A and 21 of a given curve is measured, this distance $\Delta L$ is substantially identical for all the curves studied, namely 18, 19, and 20, respectively. As in the case of compressive stresses, this $\Delta L$ value is therefore independent of the tire's rolling speed.

Thus, the instantaneous value chosen, which is representative of an elongation of an apparent contact area for both types (compressive and shear) of stresses, is the same, namely $\Delta L$.

Figure 7:
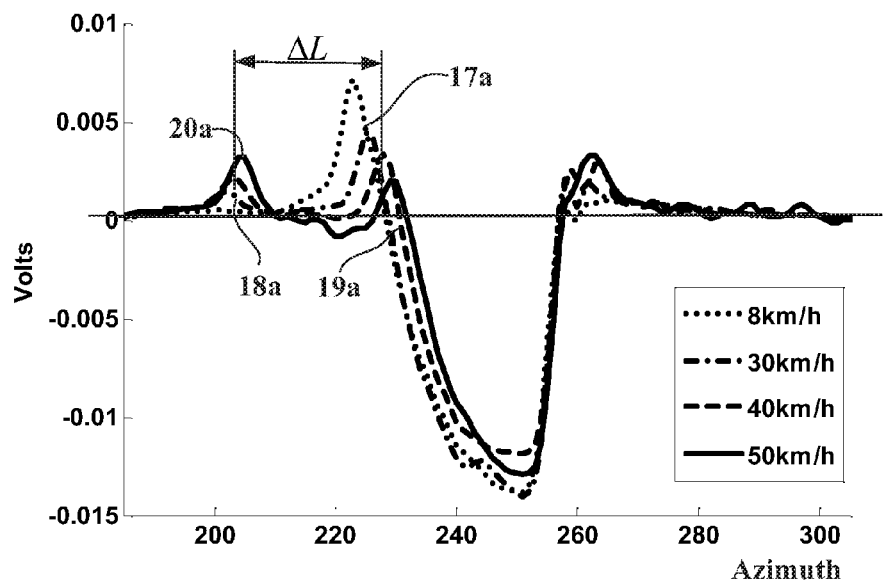

In FIG. 7, for curves 17a, 18a, 19a, and 20a studied for speeds of 8, 30, 40, and 50 km/h, respectively, and for a greater water height, namely 8 mm, this instantaneous value of the distance $\Delta L$ between the two first peaks, which are distinguished above a speed of 30 km/h, is greater. This instantaneous value nevertheless remains constant for all speeds studied at this same water height.

The reason for the elongation of the distance $\Delta L$ between the two longitudinal stress peaks is the same as that mentioned above in the case of FIGS. 4 and 5. A higher, and therefore earlier, entry of the measurement block into an apparent contact area between the tire and the ground, via the liquid medium, is established.

A first part of the apparent contact area established between the longitudinal stress sensor (i.e., the measurement block) and the ground, via the liquid medium corresponding to the height of water, is more measurable when the speed of the tire is high enough. This is because sufficient tension or pressure must be present, thanks to the speed between the tire and the road, on the volume of water of the measurement.

Thus, for the four curves studies shown in FIGS. 4 to 7, a total contact area corresponding to both direct and indirect areas of contact between the ground and the tread 2 appears for substantial compressive or shear stress values. The values displayed outside this total contact area, via the liquid medium or directly with the ground of the road, are substantially zero.

Figure 8:
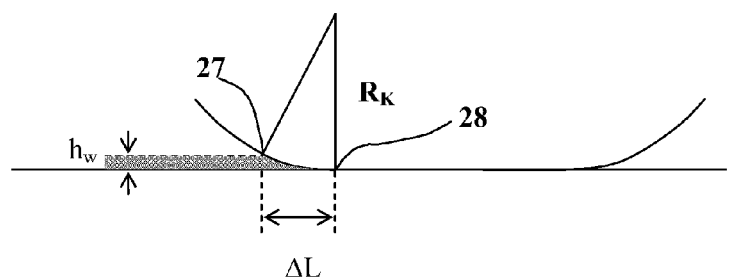
FIG. 8: a schematic representation of a ratio of water height to elongation of an apparent contact area of the tire.

FIG. 8 shows a tire with a localized flattened area on the ground and also the presence of water in front of the tire.

This presence of water is defined as a water height $h_w$ and determines, along the circumference of the tire, two points, namely a first point 27 where the water comes into contact with the tire, but where the edge or portion of the tire that includes the stress sensors is not yet in contact with the ground of the road, and a second point 28 where the water is tangential both to the ground and to the tire, but where the tread 2 makes contact with the ground.

Between these two points, the tire has a curvature that matches a radius well known to those skilled in the art, called a Koutny transition zone radius $R_K$, which is substantially different from the radius of the tire, by taking into account the flattening of the portion of the tire in contact with the ground, implying a different radius of curvature at entry into the contact area from that at exit therefrom.

Taking an orthogonal projection of the first point 27 on the ground representing the ground, a distance along the ground corresponding to an elongation $\Delta L$ of the apparent contact area is then determined between this projection and the second point 28.

This elongation $\Delta L$ of the apparent contact area of the tread with the ground corresponds substantially to that measured by the sensors 5, via the liquid medium, and for sufficiently high speeds.

A geometric model provides a trigonometric relationship between ΔL and $h_w$ according to the formula:

$$\Delta L = R_K \sin\{\arccos(1 - {}^{hw}/{}^{R_k})\}$$

and the formula:

$$h_w = K\left\{1 - \cos\left(\arcsin\frac{\Delta_K}{K} L\right)\right\}.$$

A computer program in the memory 11 of the processing unit 8 determines, from this formula and from knowledge of the instantaneous value ΔL, an estimate of the water height $h_w$.

Figure 9:
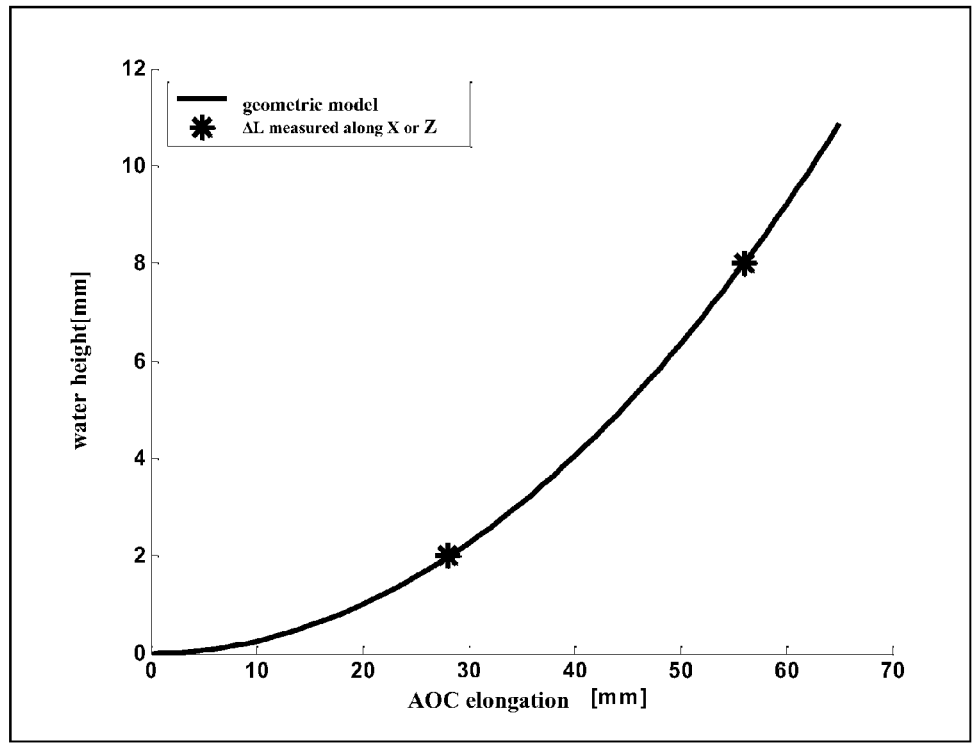
FIG. 9: a comparison between theoretical and experimental values linking water height to elongation of an apparent contact area.

FIG. 9 shows a match between the water height obtained by the above theoretical formula and knowing the instantaneous value ΔL (obtained from the stresses measured according to the method described) and actually measured cases, in which the water height is actually 2 or 8 mm. This figure indicates that it is very reasonable to model the estimate of $h_w$ starting from ΔL using the above trigonometric formula, because ΔL and $h_w$ fit well with the above formula in the cases of the actual analytical measurements described.

After having seen how the experimental curves are used to estimate the height of water present on the ground, what follows is an explanation of the processing of the same curves in order to determine the instantaneous values or criteria to be adopted for characterizing an intensity of hydroplaning.

Figure 10:
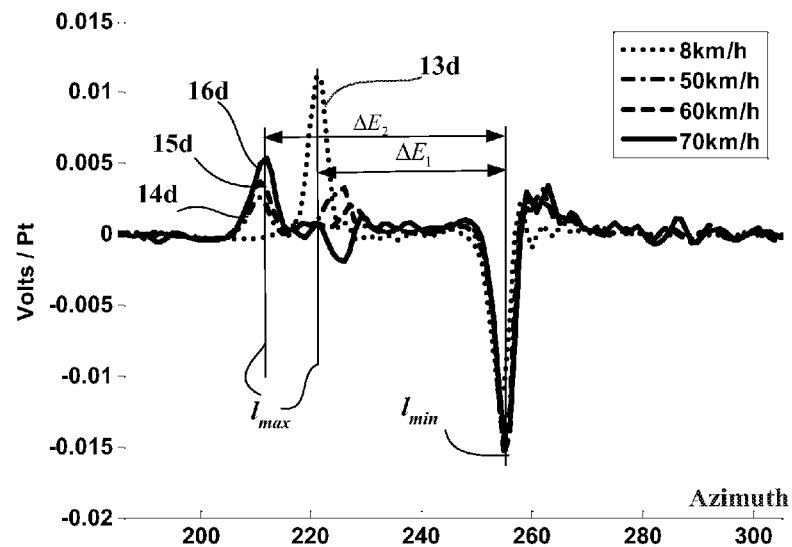
FIGS. 10 and 11: curves showing a first derivative with respect to x of a displacement of a sensor along an X axis of the stress measurements illustrated in FIGS. 4 and 5.
Figure 11:
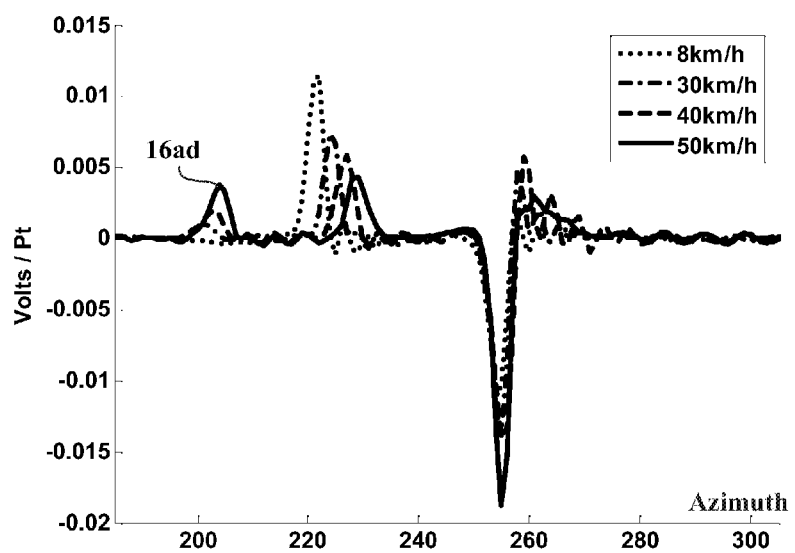

FIG. 10 illustrates a calculation of a first instantaneous value or criterion ΔE used for detecting an occurrence of hydroplaning according to an embodiment of the invention.

This figure shows curves 13d to 16d representing first derivatives of the respective compressive stress measurements with respect to a value x of a displacement of a sensor in the longitudinal rolling direction X of the tire. Curves 13d to 16d correspond to the first derivatives of curves 13 to 16, respectively, illustrated in FIG. 4.

For the four curves shown in FIG. 10, respective minima of the stress measurement first derivatives are obtained for a measurement index of 255, that is, upon exiting the apparent contact area. Respective maxima are obtained during the respective phases when constant stress measurement plateaus appear. What is thus obtained for low speeds, corresponding to curve 13d is a maximum as soon as the single plateau appears. The value of the first criterion is then $\Delta E_1$. For a higher speed of 50 km/h, corresponding to curve 14d, two positive peaks are observed upon entry into the apparent contact area corresponding to the two successive fronts of the first and second plateaus. For curve 14d, the peak of maximum amplitude is the second one, and the ΔE value is calculated using this second peak. The corresponding value of the first criterion is slightly lower than the initial value of $\Delta E_1$. There is still no jump.

However, in the case of curves 15d and 16d, obtained at speeds of 60 and 70 km/h, respectively, the positive peaks of maximum amplitude are the first peaks. Consequently, there is a jump in a value of the first criterion.

The instantaneous value ΔE is expressed as: $\Delta E = l_{min} - l_{max}$, where $l_{min}$ corresponds to a position or azimuth of $$\left(\frac{d\sigma_{dx}}{dx}\right)_{min},$$

and $l_{max}$ corresponds to a position or azimuth of $$\left(\frac{d\sigma_{d\bar{x}}^z}{dx}\right)_{max}.$$

In the case of curve 13a, at low speed, the first criterion has a value $\Delta E_1$ and in the case of curve 16d, obtained at a speed of 50 km/h, a value $\Delta E_2$. $\Delta E_2$ is substantially greater than $\Delta E_1$.

Figure 12:
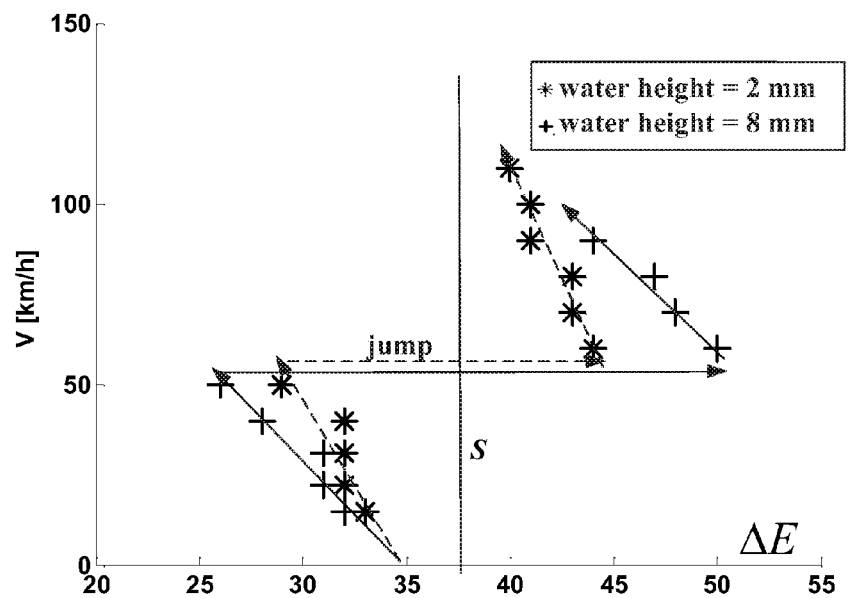
FIG. 12: a graph showing a variation of a $\Delta E$ criterion as a function of speed.

This very pronounced difference, as illustrated in FIG. 12, has the benefit of enabling the first criterion to be used for detecting an occurrence of hydroplaning. As soon as the value of the first criterion, or instantaneous value, becomes greater than a range between 35-40, this means that a jump has taken place. This jump is associated with the evolution of an anticipated plateau or first plateau due to the appearance of an area of indirect contact, that is, contact with a substantial film of water in front of the tire. As soon as this jump has been detected, a warning that there is a risk of hydroplaning should be sent to the driver. The length of the arrows in FIG. 12 shows the influence of speed on the change in the first criterion.

FIG. 5 illustrates a calculation of a second criterion or instantaneous value $R_z$. This criterion corresponds to:

$$R_z = \frac{\sigma_{zi} - \sigma_{zd}}{\sigma_{zd}},$$

in which $\sigma_{zi}$ represents an amplitude of compressive stresses of the first plateau and $\sigma_{zd}$ represents an amplitude of compressive stresses of the second plateau. Of course, in the case of curve 13a, the value of the second criterion is −1, because there is only one plateau.

Figure 13:
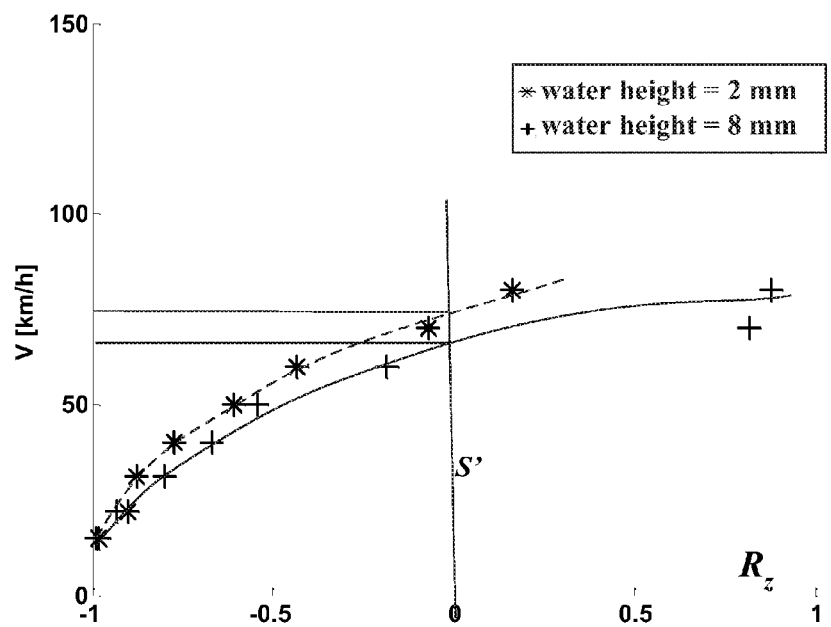
FIG. 13: a graph showing a variation in an $R_z$ criterion as a function of speed.

FIG. 13 shows a variation in the second criterion as a function of speed. It may be seen that its value passes progressively from −1 to zero and then becomes positive. The zero-crossing point corresponds to the moment when compressive stresses of the first and second plateaus become similar, which means that hydroplaning has become very pronounced. It is then essential for the driver to be immediately warned of this risk. This zero-crossing point, or a lower value if so desired, may be chosen as a threshold value. FIG. 13 also illustrates a variation of the second criterion for two water heights, namely 2 and 8 mm, respectively. Not surprisingly, this shows that the higher the speed, the more appreciable the influence of the water height. It may also be noted that, above the zero value of the second criterion, the influence of speed is very pronounced. A slight change in rolling speed can result in very large changes in hydroplaning.

FIG. 6 illustrates a principle of determining a third criterion $A_x$. The curves in this figure show, plotted on the y-axis, shear stresses along the X axis of the tread for a water height of 2 mm. This third criterion corresponds to an amplitude of the anticipated peak 21A. This amplitude progressively increases with increasing speed.

Knowing the water height and the speed of the vehicle already allows a first estimate of an intensity of hydroplaning of a tire to be obtained. However, as already indicated, this estimate is rather crude, because hydroplaning varies strongly according to a nature of the ground and a wear condition of the tire(s).

An estimate of water height according to embodiments of the invention is relatively insensitive to tire wear. However, the second instantaneous values $A_x$, $\Delta E$, and $R_z$ have the advantage of being very sensitive to variations in the nature of the ground and in the wear of the tires. Consequently, charts giving a degree of hydroplaning as a function of these criteria, drafted for various water heights, are themselves very insensitive to such variations. These charts are valid under very broad conditions, this being a major advantage of embodiments of the invention.

Figure 14:
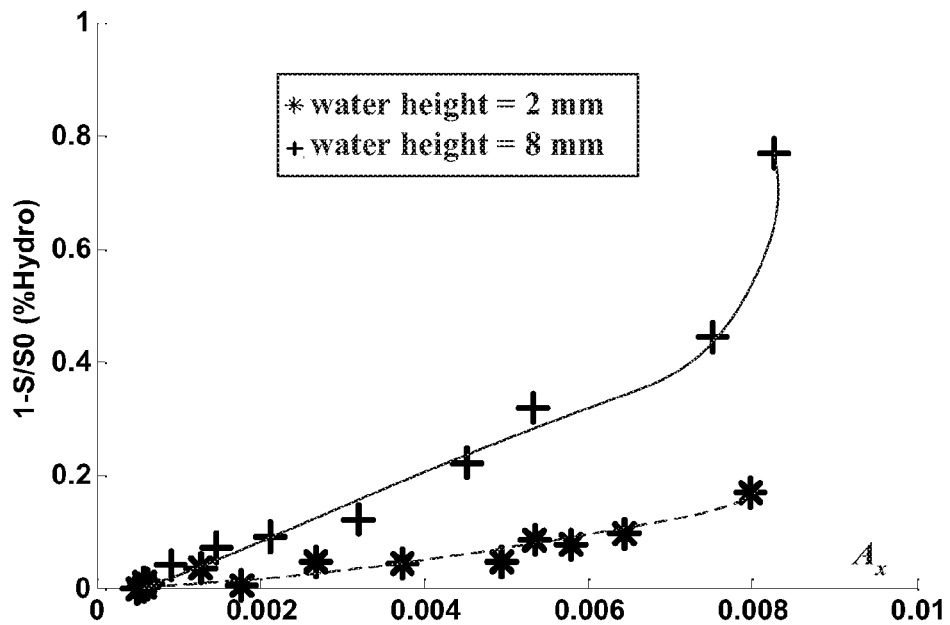
FIGS. 14, 15, and 16: a graph showing a variation of $1-S/S_0$ as a function of $A_x$, $\Delta E$, and $R_z$ criteria.
Figure 15:
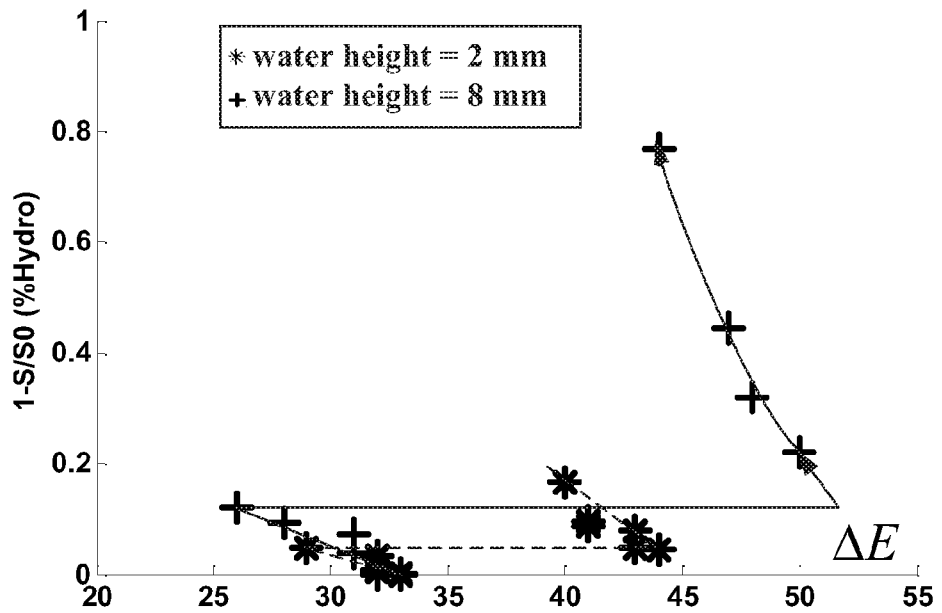
Figure 16:
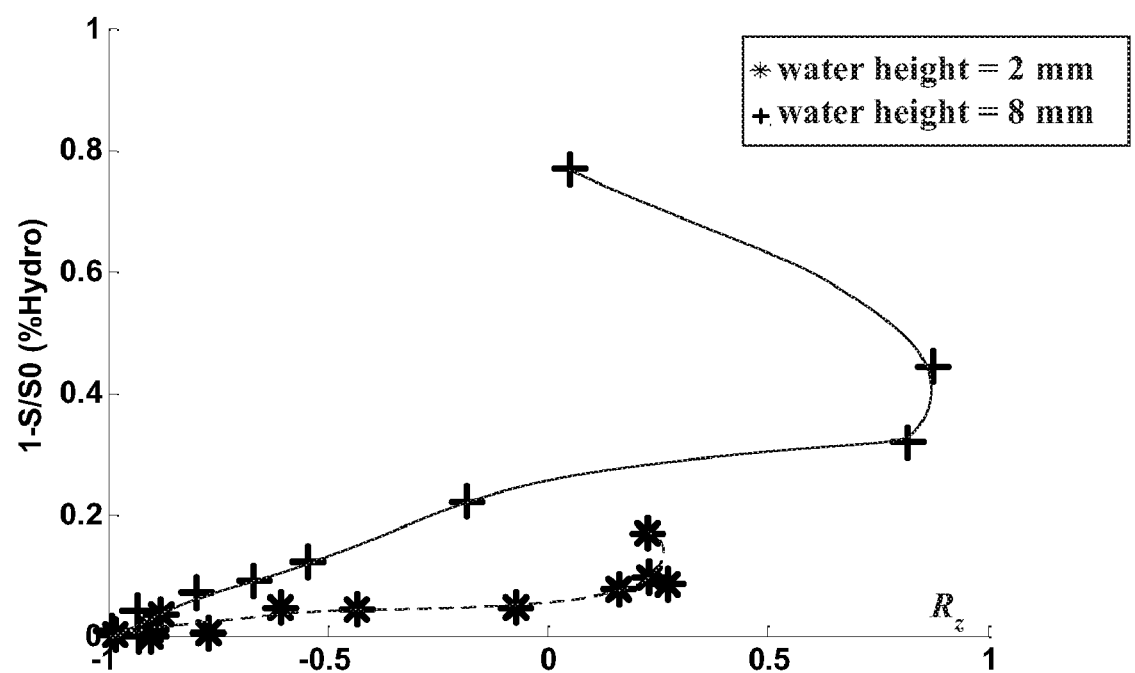

FIGS. 14, 15, and 16 show charts representing a degree of hydroplaning as a function of the criteria $A_x$, $\Delta E$, and $R_z$.

The precise form of these charts can vary depending on the criterion adopted.

FIG. 14 shows $1-S/S_0$ as a function of $A_x$. The variation is gradual and similar to that of a degree of hydroplaning as a function of speed (FIG. 3).

FIG. 15 shows $1-S/S_0$ as a function of $\Delta E$. The shape of the curves of the chart is close to a succession of inclined "Z"s for each water height. Because the curves are not one-to-one, it is desirable to record the history of the calculated values, at least the measurements relating to the last 4 or 5 revolutions, in order to be able to correctly interpret the values obtained and give a reliable estimate of the degree of hydroplaning.

FIG. 16 shows $1-S/S_0$ as a function of $R_z$. The form of the curves is again not one-to-one and, as previously, it is desirable to store in memory part of the history so as to give a reliable estimate of the degree of hydroplaning.

Optionally, in order to make the estimates of the degree of hydroplaning more robust and reliable, it may be worthwhile not to measure or utilize only a single instantaneous value or criterion but instead to use more than one criterion.

Returning to FIG. 2 showing the device according to an embodiment of the invention, a subprogram 23 of the program memory 12 of the processing unit 8 is used to extract a part of the signal received from the sensor(s) corresponding to a substantially non-zero stress signal, for example typically above a threshold.

Thus, the extraction of the part of the signal, for compressive and shear stresses, corresponding to one or more sensors passing into an apparent contact area of the tread 2, consists in extracting a part of the signal corresponding to when the sensor (or sensors) emits (or emit) a significant stress measurement signal, a duration of this portion or part of the signal corresponding to a duration of a passage of the sensor(s) through the apparent contact area.

Using a subprogam 26, data processing is carried out so as to calculate values and criteria $\Delta L$, $\Delta E$, $A_x$, and $R_z$. A comparison (step 25) is then made with data and thresholds recorded in a data zone 24.

The subprograms 29 and 30 then estimate, using charts, a water height and a degree of hydroplaning. Additional warnings may be triggered when the criteria exceed given thresholds, indicating a risk of hydroplaning.

The estimate of $1-S/S_0$ is then displayed on the dial or display unit 13, whether in analog or digital form, and, for example, as a gradual colour code, such as green, amber, or red, allowing the driver to immediately determine the degree of danger of hydroplaning. In the same way, this quantity $1-S/S_0$ is sent to the various active safety devices 14 available on board the vehicle, thus enabling the results of the respective computer programs for these safety devices to be optionally refined.

The invention is not limited to the examples described and shown, and various modifications may be made to them without departing from its scope defined by the appended claims.

The invention claimed is:

1. A method of detecting and estimating an intensity of hydroplaning of a tire of a vehicle travelling on a wet road surface, a tread of the tire being equipped with one or more sensors each capable of measuring a characteristic quantity of stresses that the tread experiences locally when the tire is rolling on the road surface, the method comprising:
   obtaining measurements of a characteristic quantity of a tire when the tire is rolling on a road surface, the measurements being obtained using one or more sensors;
   producing a signal corresponding to the measurements;
   extracting a portion of the signal relating to a passing of the one or more sensors into an apparent area of contact between the tire and the road surface;
   determining, from the extracted portion of the signal, a first instantaneous value ($\Delta L$), corresponding to a length of an indirect contact region of the apparent area of contact between the tread and the road surface, and a second instantaneous value ($\Delta E$, $R_z$, $A_x$), corresponding to an intensity of hydroplaning in the indirect contact region relative to a remainder of the apparent area of contact;
   estimating a water height ($h_w$) from a calculation that takes into account the determined first instantaneous value ($\Delta L$); and
   estimating the intensity of the hydroplaning from the estimate of the water height ($h_w$) and from the second instantaneous value ($\Delta E$, $R_z$, $A_x$).

2. A method according to claim 1, wherein the characteristic quantity measured by the one or more sensors is characteristic of compressive stresses experienced by the tread in a direction normal to a plane of the road surface.

3. A method according to claim 2, wherein the determining of a first instantaneous value ($\Delta L$) includes:
   when the extracted portion of the signal includes two successive plateaus, the instantaneous value ($\Delta L$) is a measurement of a length of the first plateau, on an entry side of the apparent area of contact; and
   when the extracted portion of the signal includes a single plateau, the instantaneous value is zero.

4. A method according to either of claims 2 and 3, wherein the determining of a second instantaneous value ($\Delta E$) includes:
   differentiating the signal;
   determining a minimum value $$\left(\frac{d\Box}{dx}\right)_{min}$$

and a maximum value $$\left(\frac{d\Box}{dx^2}\right)_{max}$$

of the differentiated signal and also determining positions of the minimum value and the maximum value ($l_{min}$, $l_{max}$), respectively; and
calculating the second instantaneous value ($\Delta E$) to correspond to a difference in position between the minimum and maximum values of the differentiated signal: $\Delta E = l_{max} - l_{min}$.

5. A method according to claim 4, wherein an alarm is triggered when the second instantaneous value is above a given threshold.

6. A method according to one of claims 2 and 3, wherein the determining of a second instantaneous value ($R_z$) includes:
when the extracted portion of the signal includes two successive plateaus, the instantaneous value ($R_z$) is equal to:

$$R_z = \frac{\sigma^{zi} - \sigma^{zd}}{\sigma^{zd}},$$

in which $\sigma_{zi}$ represents an amplitude of compressive stresses of the first plateau and $\sigma_{zd}$ represents an amplitude of compressive stresses of the second plateau; and
when the extracted portion of the signal includes a single plateau, the instantaneous value ($R_z$) is equal to −1.

7. A method according to claim 6, wherein an alarm is triggered when the instantaneous value ($R_z$) is above a given value.

8. A method according to claim 7, wherein an alarm is triggered when the instantaneous value ($R_z$) is positive.

9. A method according to claim 1, wherein the characteristic quantity measured by the one or more sensors is characteristic of longitudinal shear stresses experienced by the tread.

10. A method according to claim 9, wherein the determining of a first instantaneous value ($\Delta L$) includes:
when the extracted portion of the signal includes, on an entry side of the apparent area of contact, two successive positive peaks, the instantaneous value is a measurement of a length ($\Delta L$) separating respective maxima of the two peaks; and
when the extracted portion of the signal includes a single positive peak, the instantaneous value ($\Delta L$) is zero.

11. A method according to one of claims 9 and 10, wherein the determining of a second instantaneous value ($A_x$) includes:
when the extracted portion of the signal includes, on an entry side of the apparent area of contact, two successive positive peaks, the instantaneous value is a measurement of an amplitude ($A_x$) of the first positive peak; and
when the extracted portion of the signal includes a single positive peak, the instantaneous value ($A_x$) is zero.

12. A method according to claim 1, wherein the one or more sensors measures both a characteristic quantity of normal compressive stresses and a characteristic quantity of longitudinal shear stresses experienced by the tread.

13. A method according to claim 1, wherein the water height ($h_w$) is determined from the instantaneous value ($\Delta L$) using a chart.

14. A method according to claim 1, wherein the water height ($h_w$) is determined according to:

$$h_w = K\left\{1 - \cos\left(\arcsin\frac{\Delta K}{K}\frac{L}{}\right)\right\},$$

where $h_w$ is an estimation of the water height, $\Delta L$ is the instantaneous value, and K is a constant associated with the tire.

15. A method according to claim 14, wherein the factor K is a Koutny transition zone radius ($R_K$).

16. A method according to claim 1, wherein the intensity of the hydroplaning is estimated from a quantity $1-S/S_0$, which is a function of two surfaces:
a first surface S corresponding to an instantaneous area of direct contact of the tread measured on a wet ground at a speed of the vehicle; and
a second surface $S_0$ corresponding to a maximum ideal area of direct contact of the tread on a dry ground and/or for a low speed of the vehicle guaranteeing that hydroplaning cannot start.

17. A method according to claim 16, wherein the quantity $1-S/S_0$ characterizing the intensity of the hydroplaning is determined from:
at least a second instantaneous value ($\Delta E, R_z, A_x$);
an estimated calculation of a water height ($h_w$) present on the road surface; and
an experimental chart representing a variation in the quantity $1-S/S_0$ as a function of the second instantaneous value ($\Delta E, R_z, A_x$) for various predetermined water heights ($h_w$).

18. A method according to claim 17, wherein an alarm is triggered when the quantity $1-S/S_0$ exceeds a given threshold.

19. A device for detecting and estimating an intensity of hydroplaning of a tire of a vehicle travelling on a wet road surface, the device comprising:
a tire, the tire having a tread that is equipped with one or more sensors each capable of measuring a characteristic quantity of stresses experienced by the tread rolling on the road surface;
a transmitter for transmitting a signal corresponding to measurements of the characteristic quantity as measured by the one or more sensors; and
a signal processing unit for extracting, from the transmitted signal, a signal portion corresponding to a number or to a duration of passage of the one or more sensors in an area of contact of the tire rolling on the road surface, wherein the signal processing unit is configured to execute a program for implementing a method of detecting and estimating an intensity of hydroplaning of a tire of a vehicle travelling on a wet road surface based on an extracted signal portion, the method including:
obtaining measurements of a characteristic quantity of a tire when the tire is rolling on a road surface, the measurements being obtained using one or more sensors;
producing a signal corresponding to the measurements;
extracting a portion of the signal relating to a passing of the one or more sensors into an apparent area of contact between the tire and the road surface;
determining, from the extracted portion of the signal, a first instantaneous value ($\Delta L$), corresponding to a length of an indirect contact region of the apparent area of contact between the tread and the road surface, and a second instantaneous value ($\Delta E, R_z, A_x$), corresponding to an intensity of hydroplaning in the indirect contact region relative to a remainder of the apparent area of contact;
estimating a water height ($h_w$) from a calculation that takes into account the determined first instantaneous value ($\Delta L$); and
estimating the intensity of the hydroplaning from the estimate of the water height ($h_w$) and from the second instantaneous value ($\Delta E, R_z, A_x$).

* * * * *